Jan. 7, 1964   V. B. GOLD   3,117,214
BODY MAKER AND METHOD
Filed June 12, 1961   2 Sheets-Sheet 1
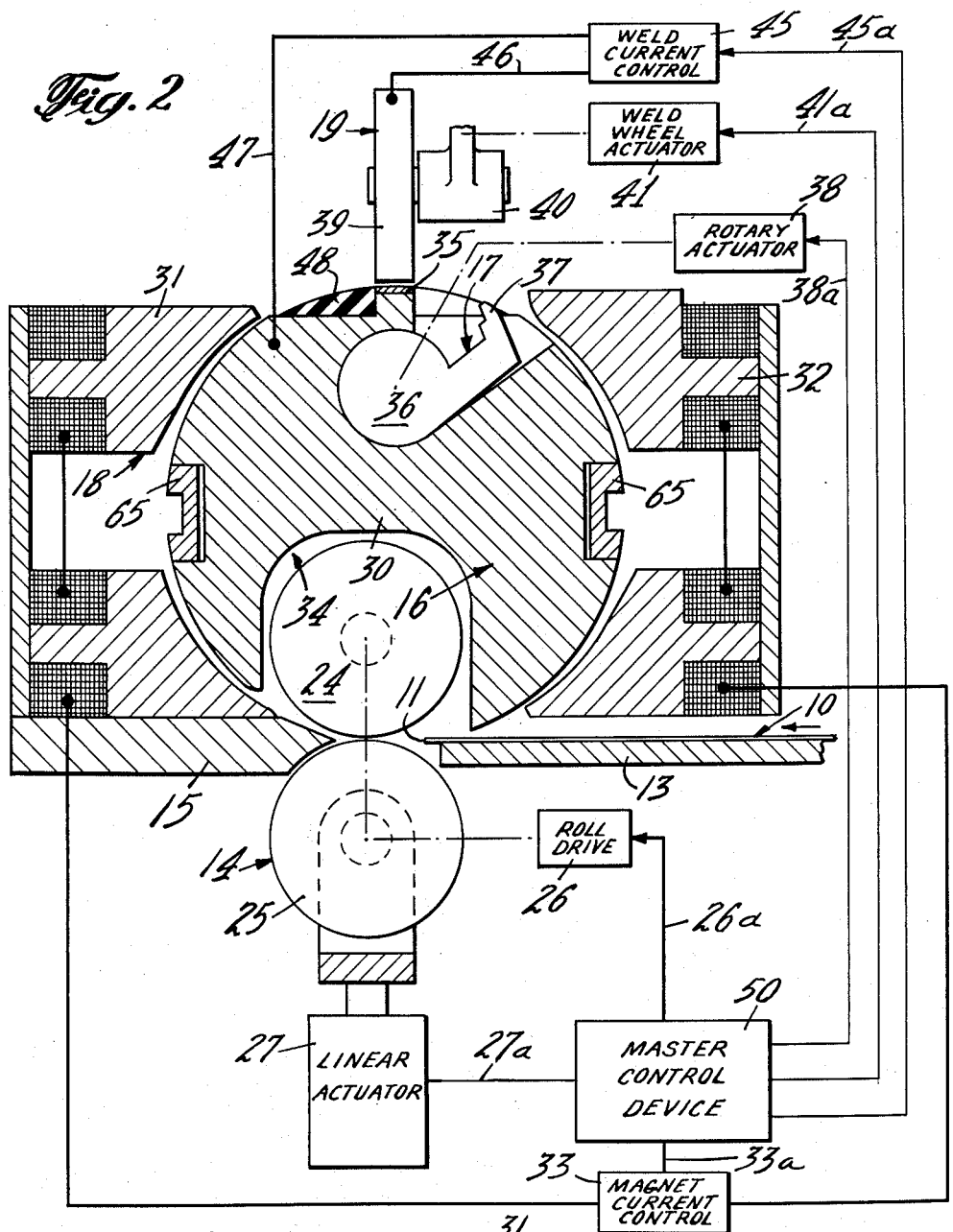
INVENTOR.
VANCE BURTON GOLD
BY Clyde H. Haynes
George W. Reiber
ATTORNEYS Jan. 7, 1964  V. B. GOLD  3,117,214
BODY MAKER AND METHOD
Filed June 12, 1961  2 Sheets-Sheet 2
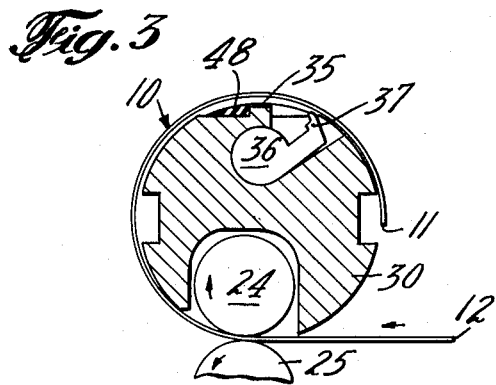
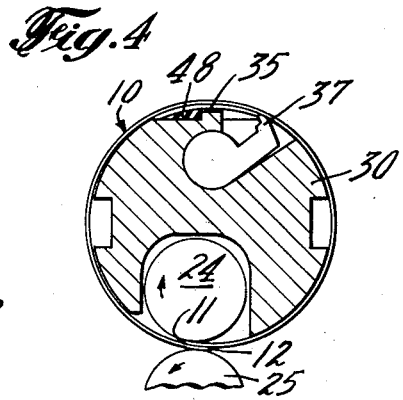
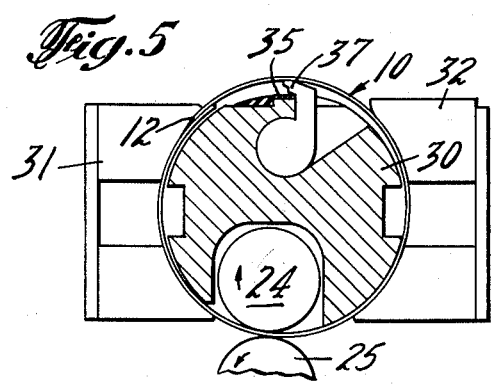
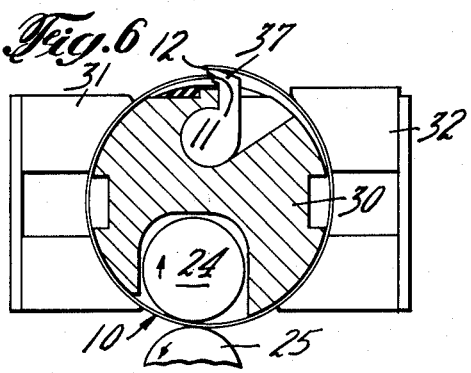
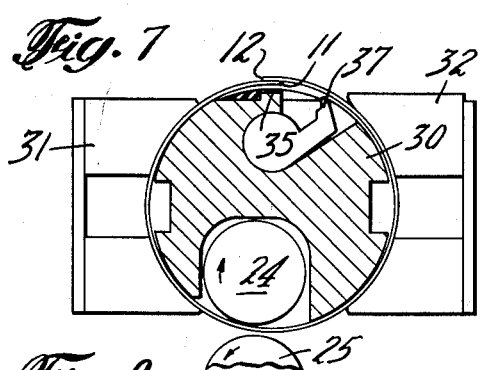
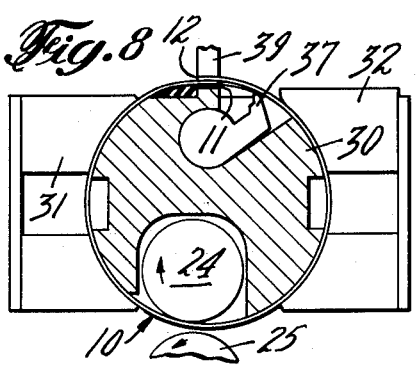
INVENTOR.
VANCE BURTON GOLD
BY Clyde H. Haynes
George W. Reiber
ATTORNEYS

United States Patent Office 3,117,214
Patented Jan. 7, 1964

3,117,214
BODY MAKER AND METHOD
Vance Burton Gold, Lombard, Ill., assignor to American Can Company, New York, N.Y., a corporation of New Jersey
Filed June 12, 1961, Ser. No. 116,385
17 Claims. (Cl. 219—64)

The present invention relates to the process of transforming a sheet of material into an endless body and to apparatus operative in accordance with that method.

One of the objects of the present invention is to transform a sheet of material into an endless body by passing the sheet through the rolls which move it into an endless path, positioning the leading and lagging edges contiguous to each other at a location angularly remote from the rolls and thereafter fastening the contiguous edges together while they are in that remote position.

Another object of the present invention is to provide an apparatus which will wrap a sheet of material about a horn or welding electrode, position the leading and lagging edges of the sheet contiguous to each other, and thereafter weld or otherwise fasten those edges together all at the same station on the horn or electrode.

Numerous other objects and advantages of the invention will be apparent as it is better understood from the following description, which, taken in connection with the accompanying drawings, discloses a preferred embodiment thereof.

Referring to the drawings:

FIGURE 1 is a schematic top view of an apparatus incorporating the present invention.

FIG. 2 is a schematic enlarged sectional view of the apparatus of FIG. 1 with certain parts illustrated in cross-section for purposes of clarity and further illustrating the actuating, driving, and control of the apparatus.

FIGS. 3, 4, 5, 6, 7 and 8 are fragmentary schematic elevations similar to FIGURE 1 and showing the position of various parts of the apparatus during a complete cycle of operation.

FIG. 9 is a time chart of the operation of various parts of the apparatus of FIGS. 1 and 2 during a complete cycle of operation in which a sheet of material is transformed into an endless body.

An apparatus for carrying out the process of transforming sheet 10 of material having a leading edge 11 and a lagging edge 12 into an endless body in which the leading and lagging edges 11 and 12 are contiguous to each other is illustrated schematically in FIGURES 1 and 2. In this apparatus sheet 10 is moved from a line of travel defined by a feeder 13 by a sheet mover 14. Sheet 10 is arranged in such manner that leading edge 11 travels first in and through the sheet mover 14. The apparatus further includes a deflector 15 and guide 16 which, jointly with sheet mover 14, define an endless path through which leading edge 11 will lead sheet 10. Guide 16 has physical dimensions capable of positioning leading edge 11 contiguous to lagging edge 12, after leading edge 11 has completed its first travel about the endless path and meets lagging edge 12 at sheet mover 14 and sheet 10 is lying entirely in the endless path defined by guide 16. The apparatus further includes a positioner 17 located in a pre-determined position remote from sheet mover 14 and in operative relation with guide 16. Positioner 17 cooperates with leading edge 11 in its second travel about the endless path to terminate movement of sheet 10 in the endless path with contiguous leading edge 11 and lagging edge 12 at a pre-determined position remote from sheet mover 14. After sheet 10 has thus been positioned it is held in that remote position by a sheet arrester 18 which is operative to hold leading edge 11 and lagging edge 12 in the remote position and contiguous to each other while a fastener 19 fastens leading edge 11 and lagging edge 12 together to thereby free them from relative movement therebetween.

In the specific example illustrated in further detail in the schematic of FIG. 1 sheet 10 represents a flat blank which is to be formed into a can body in which leading edge 11 and lagging edge 12 are welded together to form a side seam. Sheet mover 14 comprises a pair of rolls 24 and 25 driven by means of a suitable roll drive 26. Roll 25 is moved towards and away from roll 24 by means of a suitable linear actuator 27 which positions roll 25 sufficiently close to roll 24 that sheet 10 will be engaged and gripped by both rolls when it is passed therebetween so that the rolls 24 and 25 will move sheet 10, and positions it sufficiently far from roll 24 that sheet 10 may be positioned between rolls 24 and 25 without being engaged by rolls 24 and/or 25. As illustrated in FIG. 1, feeder 13, sheet mover 14 and deflector 15 are aligned in a line of travel wherein leading edge 11 will move from feeder 13 between rolls 24 and 25 and thereafter engage deflector 15 which will deflect leading edge 11 into the endless path and prestress the body so it will assume a natural cylindrical shape.

Guide 16, as illustrated in FIG. 1, includes a horn 30 about which the body 10 is wrapped and a pair of electromagnets 31 and 32 disposed on diametrically opposite sides of and spaced from horn 30 and also disposed on opposite sides of sheet mover 14. Horn 30 is constructed in this instance from current-conductive material and has a recess 34 in the bottom side thereof and in which roll 24 is located. Horn 30 has a replaceable member defining a welding electrode surface 35 in the top side thereof disposed between electro-magnets 31 and 32 and diametrically across horn 30 from sheet mover 14. Electrode surface 35 is in the hereinbefore referred to predetermined position remote from the sheet mover and in which the leading and lagging edges are fastened together.

Positioner 17 in this instance is in the form of a stop member 36 bearinged in horn 30 for rotatable movement relative thereto and provided with stop or positioning fingers 37 extendable outwardly from horn 30 at a position next adjacent welding electrode surface 35 when stop member 36 is rotated to one position, and retractible into horn 30 when stop member 36 is rotated to another position. Rotation of stop member 36 between its two positions, wherein finger 37 is extended outwardly from horn 30 and wherein finger 37 is withdrawn within the outer confines of horn 30, is accomplished by any suitable rotary actuator 38 suitably mechanically coupled to stop member 36.

Fastener 19 includes welding electrode surface 35 and a welding wheel 39 operably supported by a weld wheel support 40 mechanically coupled to a welding wheel actuator 41 which causes movement of welding wheel 39 along welding electrode surface 35 in such manner that pressure is applied to any material between welding wheel 39 and welding electrode surface 35 during their relative movements.

The welding circuit for welding leading edge 11 to lagging edge 12 while they are in the welding position comprises a weld current source and control 45 connected in series circuit with welding wheel 39, welding electrode surface 35 and suitable welding leads 46 and 47. If desired and as illustrated welding electrode surface 35 may be at least partly surrounded by an insulator 48 carried by horn 30.

The operation of each of the components in the apparatus is suitably controlled in any well-known manner, for example, by means of a master control device 50, as schematically illustrated in FIG. 2. Roll drive 26, linear actuator 27, electro-magnet current control 33, rotary actuator 38, weld wheel actuator 41 and weld current source 45 are operatively connected to a master control device 50 by means of suitable command and feedback control connectors represented by control lines 26a, 27a, 33a, 38a, 41a and 45a respectively.

Master control device 50 operates in accordance with the time chart of FIG. 9 wherein the entire time chart illustrates one complete cycle of the operation of the apparatus and each solid line represents the function indicated for its respective part during the cycle. In accordance with the time chart rolls 24 and 25 must rotate at least from the beginning of the cycle for a period of time sufficient to move the leading edge 11 of the sheet 10 more than one complete travel about the endless path, and in this instance throughout one and one-half turns about horn 30. In addition, the rolls 24 and 25 must be together during this period of time so as to engage the sheet 10 and cause it to move in the endless path. It is understood, however, that because the rolls 24 and 25 may be supported apart by operation of linear actuator 27 after the end of movement of the sheet 10, they may be continuously rotated throughout the cycle if desired.

In FIG. 3 the position of the sheet 10 is illustrated in one of its attained positions during operation of the apparatus between the cycle time O and A in FIGURE 9. FIG. 4 represents the attained position of the sheet 10 at cycle time B in FIG. 9 and wherein the apparatus has moved leading edge 11 a complete travel through the endless path and contiguous to lagging edge 12. It is noted that in this instance leading edge 11 and lagging edge 12 overlap each other and are both illustrated as being between rolls 24 and 25. At this time sheet 10 is being moved in the endless path by rotation of rolls 24 and 25 and because linear actuator 27 is urging roll 25 towards 24.

After leading edge 11 has once passed positioner 17, master control device 50 causes rotary actuator 38 to actuate stop member 36 to position its stop finger 37 within the endless path. This is illustrated in FIG. 5 which coincides with the cycle time after time C in FIG. 9. Finger 37 is retained in this position until movement of sheet 10 has ceased and rolls 24 and 25 have been separated.

The separation of rolls 24 and 25 is controlled by master device 50 causing linear actuator 27 to operate to move roll 25 away from roll 24. In accordance with the time chart of FIG. 9 roll 25 moves away from roll 24 and the sheet 10 stops moving at cycle time point D. It is noted that leading edge 11 abuts finger 37 in FIG. 6, which illustrates the position of the parts immediately prior to the reaching of cycle time point E in FIG. 9. To arrest the sheet and prevent bouncing of leading edge 11 away from finger 37 during the accurate positioning of leading edge 11 between welding wheel 39 and welding electrode surface 35, master control device 50 causes magnet current control 33 to energize electro-magnets 31 and 32 at a time prior to the abutment of leading edge 11 against fingers 37. In this instance, master control device 50 operates in accordance with the arrester operative line of FIG. 9 and at a time between the cycle time points C and D to energize the electro-magnets 31 and 32. After the electro-magnets 31 and 32 have been energized, the master control 50 causes the rotary actuator 38 to retract fingers 37 into the confines of the horn. Energization of electro-magnets 31 and 32 is continued after positioner 17 is retracted away from leading edge 11, as illustrated in FIG. 7 and throughout the entire welding cycle as illustrated in FIG. 8.

Next the master control device 50 causes weld wheel actuator 41 and weld current source and control 45 to operate after positioner 17 has been retracted or not earlier than the cycle time point E, and to continue operation thereafter for sufficient length of time to complete the fastening and welding of leading edge 11 and lagging edge 12. After the weld has been completed master control device 50 is operative to cause magnet current control 33 to de-energize the magnets thereby returning the apparatus to condition for start of another cycle of operation.

In some instances the sheet 10 may be so thin that the electro-magnetic fields established by electro-magnets 31 and 32 do not accurately arrest and hold the sheet in the arrested position during the welding cycle, as well as holding leading edge 11 and lagging edge 12 in the correct position relative to each other so that the finished can will be of the correct size. In such instances it has been found desirable to provide ferromagnetic members, for example, members 65 operatively supported by horn 30 in the magnetic field established by the electro-magnets as an aid for this purpose.

It is thought that the invention and many of its attendant advantages will be understood from the foregoing description and it will be apparent that various changes may be made in the form, construction, and arrangement of parts of the apparatus mentioned herein and in the steps and their order of accomplishment of the method described herein, without departing from the spirit and scope of the invention or sacrificing all of its material advantages, the apparatus and method hereinbefore described being merely a preferred embodiment thereof.

I claim:

1. The process of transforming a sheet of material having a leading edge and a lagging edge into a tubular body in which the leading and lagging edges are contiguous to each other, said process comprising the steps of passing the sheet leading edge first into moving means at a station, guiding the leading edge in a curvilinear path in said station which returns it to its original point of entry into the sheet moving means, positioning the leading edge contiguous with the lagging edge in said station and passing both edges through said sheet moving means and in the same curvilinear path previously defined by the movement of the leading edge to a pre-determined position in said station angularly spaced from the sheet moving means, arresting the sheet of material with said leading and lagging edges in contiguous relationship in said spaced position with said sheet in said sheet moving means and in said curvilinear path, and fastening the leading and lagging edges together in said station while they are in said spaced position.

2. The process of transforming a sheet of material having a leading edge and a lagging edge into a tubular body in which the leading and lagging edges overlap each other, said process comprising the steps of passing the sheet leading edge first between a pair of sheet-engaging rolls at a station, deflecting the leading edge from the line of travel of the sheet as it leaves said rolls, guiding the leading edge in a curvilinear path in said station which returns it into its original point of entry into the rolls, positioning the leading edge in lapped engagement with the lagging edge in said station and simultaneously passing both edges through said rolls and in the same curvilinear path previously defined by the movement of the leading edge to a predetermined position in said station angularly spaced from the rolls, arresting the sheet of material with said leading and lagging edges in overlapped condition in said spaced position with said sheet completely encircling one of said rolls, and fastening the leading and lagging edges together in said station while they are in said spaced position.

3. An apparatus for transforming a sheet of material having a leading edge and a lagging edge into a tubular body in which the leading and lagging edges are contiguous to each other, said apparatus comprising moving means located at a station for moving said sheet longitudinally, guiding means in said station for guiding said sheet in a curvilinear path as it is being moved by said moving means and for bringing the leading and lagging edges contiguous to each other, positioning means in said station for positioning the contiguous edges of said sheet in a predetermined position angularly spaced from said moving means while said sheet is in said curvilinear path, arresting means in said position operative to hold said edges in said spaced position, and fastening means in said station and operative at said spaced position to fasten the contiguous leading and lagging edges together, and control means controlling the operation of each of the other means.

4. The structure as defined in claim 3 additionally including the limitation of said guide means comprising a horn and electro-magnets disposed on diametrically opposite sides of said horn and spaced therefrom a distance sufficient to allow the sheet to move in its curvilinear path between the horn and the electro-magnets.

5. The structure as defined in claim 3 including the additional limitation of said positioning means comprising a movable stop finger member supported by said guiding means for actuation relative thereto into and out of said curvilinear path.

6. The structure as defined in claim 3 including the additional limitation of said arresting means comprising electro-magnets energizable to hold the sheet in the curvilinear path while the contiguous leading and lagging edges are fastened by the fastening means.

7. A process for forming a flat rectangular blank into a tubular body comprising the steps of passing said blank longitudinally into a forming station, rolling said blank about a forming axis in said station to bring said blank to cylindrical shape with its leading and trailing edges in contiguous relation, rotating said cylindrically-shaped blank about said axis to bring said contiguous edges to a predetermined angular position in said station, registering said contiguous edges at said angular position to confine said blank about said axis to a predetermined cylindrical size, and welding said registered edges together at said angular position in said station to form a side seam longitudinally of said body.

8. A process for forming a flat rectangular blank into a tubular body comprising the steps of passing said blank longitudinally into a forming station, rolling said blank about a forming axis in said station to bring said blank to cylindrical shape with its leading and trailing edges in overlapped relation, rotating said cylindrically-shaped blank about said axis to bring said overlapped edges to a predetermined angular position in said station, positively registering said leading edge at said angular position, substantially simultaneously subjecting said rotating blank to the flux of a magnetic field to hold said overlapped edges in registered engagement at said angular position and confine said blank about said axis to a predetermined cylindrical size, and welding said registered overlapped edges together at said angular position in said station to form a side seam longitudinally of said body.

9. An apparatus for forming a flat rectangular blank into a tubular body at one forming station comprising a cylindrical horn in said station, means for feeding said blank peripherally about said horn in said station to bring said blank to cylindrical shape with its leading and trailing edges in contiguous relation, said means being operative to rotate said cylindrically-shaped blank about the axis of said horn to bring said contiguous edges to a predetermined angular position in said station spaced from said feeding means, means operative in said station for registering said contiguous edges at said angular position, means operative in said station for arresting the rotation of said blank as said contiguous edges reach said angular position and for holding said edges in registered engagement at said angular position to confine said blank about said axis to a predetermined cylindrical size, and means operative at said angular position in said station to fasten said registered edges together in a side seam longitudinally of said body.

10. An apparatus for forming a flat rectangular blank into a tubular body at one forming station comprising a cylindrical horn in said station, roller means for feeding said blank peripherally about said horn in said station to bring said blank to cylindrical shape with its leading and trailing edges in contiguous relation, said roller means being operative to rotate said cylindrically-shaped blank about the axis of said horn to bring said contiguous edges to a predetermined angular position in said station spaced from said roller means, means operative in said station for positively registering said contiguous edges at said angular position, electro-magnet means in said station for arresting the rotation of said blank as said contiguous edges reach said angular position and being operative to hold said edges in registered engagement at said angular position to confine said blank about said axis to a predetermined cylindrical size, welding electrodes operative at said angular position in said station to weld said registered edges together in a side seam longitudinally of said body, and control means operative to associate said roller means, registering means, electro-magnet means and welding electrodes in a timed forming cycle.

11. The apparatus described in claim 10 wherein said horn is of current-conductive material and acts as one of said electrodes for effecting said welded side seam.

12. The apparatus described in claim 10 wherein said roller means comprise a pair of coacting rolls which are linearly movable relative to each other for disengagement with said blank.

13. The apparatus described in claim 10 wherein said registering means comprise a finger member mounted in recessed relation in said horn for actuation into and out of positive engagement with said leading edge at said angular position.

14. The apparatus described in claim 16 wherein said control means has an operative sequence during said cycle to move said registering means into engageable relation with said leading edge as said edges approach said angular position and retract said registering means after said edges have come to a stop, to de-activate said roller means substantially simultaneously with the arrival of said edges at said angular position, to activate said electro-magnet means for an interval preceding the arrival of said edges at said angular position and continuing after the retraction of said registering means, and to energize said welding electrodes during said interval.

15. The apparatus described in claim 10 wherein said electro-magnet means comprise a plurality of magnets spaced about and from said horn and which have contoured inner faces defining with said horn a curvilinear path through which said blank is fed.

16. The apparatus described in claim 15 wherein at least a portion of said horn intermediate the respective poles of said magnets is of ferro-magnetic material to concentrate the flux in the field of said magnets and thereby increase the arresting force of said field at predetermined positions about the periphery of said horn.

17. An apparatus for forming a flat rectangular blank into a tubular body at one forming station comprising a cantilevered cylindrical horn, coacting rollers for feeding said blank peripherally about said horn in said station to bring said blank to cylindrical shape with its leading and trailing edges in overlapped relation, said rollers being operative to rotate said cylindrically-shaped blank about the axis of said horn to bring said overlapped edges to a predetermined angular position in said station spaced from said rollers, a registering member mounted in said horn in said station for movement into and out of positive engagement with said leading edge at said angular position, contoured electro-magnets spaced about and from the periphery of said horn and defining therewith a curvilinear path through which said blank is guided, said magnets being operative during an interval to subject said blank to a magnetic field to hold said overlapped edges in registration at said angular position and to confine said blank about said axis to a predetermined cylindrical size, welding electrodes operative at said angular position in said station to weld said overlapped edges together in a side seam longitudinally of said body, and control means associating said rollers, registering member, electro-magnets and electrodes in a timed forming cycle.

References Cited in the file of this patent
UNITED STATES PATENTS

| | | |
|---|---|---|
| 2,047,964 | Hothersall | July 21, 1936 |
| 2,187,740 | Hothersall | June 23, 1940 |
| 2,353,728 | Hubbell | July 18, 1944 |